United States Patent [19]

Rawson et al.

[11] 4,334,764
[45] Jun. 15, 1982

[54] SHEET FEEDING APPARATUS

[76] Inventors: Lionel E. J. Rawson, Fairhill, Ash Priors, Taunton, Somerset; John Wray, Westwood House, Pitney, Langport, Somerset, both of England

[21] Appl. No.: 144,891

[22] Filed: Apr. 29, 1980

[30] Foreign Application Priority Data

May 8, 1979 [GB] United Kingdom ............... 7915789

[51] Int. Cl.³ ............................................. G03G 15/00
[52] U.S. Cl. .................................. 355/14 SH; 226/10; 355/3 SH; 355/75
[58] Field of Search ................. 355/35 H, 14 SH, 50, 355/3 R, 75; 226/74, 78, 10, 11, 25

[56] References Cited

U.S. PATENT DOCUMENTS

| | | | |
|---|---|---|---|
| 3,446,554 | 5/1969 | Hitchcock | 355/75 |
| 3,800,992 | 4/1974 | Yamagishi | 226/11 |
| 3,804,514 | 9/1972 | Jasinski | 355/75 |
| 3,988,065 | 10/1976 | Mileski | 355/64 |
| 3,997,093 | 12/1976 | Aizawa et al. | 226/74 X |
| 4,010,882 | 3/1977 | Turner | 226/11 |
| 4,068,946 | 1/1978 | Eschweiler | 355/64 |
| 4,086,007 | 4/1978 | Smith et al. | 355/3 SH |
| 4,087,172 | 5/1978 | Dongen | 355/3 SH |
| 4,185,760 | 1/1980 | McNew | 355/3 SH |
| 4,264,200 | 4/1981 | Tickner et al. | 355/3 SH |

FOREIGN PATENT DOCUMENTS

2375634 7/1978 France .
1501439 5/1975 United Kingdom .

*Primary Examiner*—Richard L. Moses
*Attorney, Agent, or Firm*—Hane, Roberts, Spiecens & Cohen

[57] ABSTRACT

Apparatus for automatically feeding sheet material such as fan fold paper to a photocopier in which the apparatus may be movable towards and away from the window of the photocopier either by disconnecting the apparatus completely from the photocopier by means of readily releasable clamps or by pivoting part of the apparatus away from the window of the photocopier whereby the apparatus may be used not only to photocopy fan fold paper but used in a conventional manner to photocopy normal documents. Control signals to operate the apparatus are derived by a light sensitive means viewing the light source within the photocopier through the window of the photocopier.

16 Claims, 9 Drawing Figures

SHEET FEEDING APPARATUS

The present invention relates to sheet feeding apparatus.

The apparatus is particularly for use with a photocopier. Photocopiers of conventional form will reproduce information from a single sheet. If more than one sheet is to be reproduced it is generally necessary for an operator to manually feed one sheet after another to the photocopier for reproduction. A particular problem arises in the use of continuous sheet material such as computer fan fold paper. This fan fold paper is widely used, and if it is desired to photoreproduce the information on the fan fold paper then it has to be fed by hand to the photocopier which is tedious and time consuming. It is known, however, to provide photocopiers with a device for feeding fan fold paper for reproduction but this has the disadvantage that, if built into the photocopier, it increases the cost of the photocopier and if it is to be built into an existing photocopier as in U.S. Pat. No. 4,068,946 the photocopier requires extensive modification, both to attach the apparatus and to provide appropriate signals to operate the apparatus. Furthermore, persons having only a limited requirement for such a facility have to purchase or hire a photocopier with this facility built in at greater cost than a conventional photocopier despite their limited use for such a machine or hire or buy an accessory for existing photocopier which requires extensive modification of the photocopier and is hence unnecessarily expensive. Furthermore in the U.S. Pat. No. 4,068,946 the apparatus for feeding fan fold paper which may be an accessory seems to be solely intended to convert a conventional photocopier to a photocopier which may feed fan fold paper and there seems no provision for the easy removal of the paper feeding apparatus, either temporarily or for extensive periods whereby the photocopier may also be used in its conventional mode to photoreproduce conventional documents. Thus once the accessory has been attached to the photocopier it is dedicated to the copying of fan fold paper.

It is therefore a first object of the present invention to provide an apparatus for automatically feeding sheet material to a photocopier for reproduction which can be removably connected to the photocopying apparatus.

It is a second object of the invention that the signals required to control the apparatus are provided from the photocopier by releasable means.

It is a further object of the invention to provide apparatus for automatically feeding sheet material to a photocopier in such a manner that the apparatus may be readily adapted to allow the photocopier to be used to photocopy normal documents when not required to automatically feed sheet material.

The present invention provides apparatus for automatically feeding sheet material to a photocopier for reproduction comprising means for removably connecting the apparatus to a photocopier, means for feeding the sheet material, said feeding means being adapted to feed said sheet material discontinuously so that whilst the sheet material is stationary it may be reproduced, and releasable means for receiving signals from the photocopier for controlling operation of the feeding means.

The releasable signal receiving means may comprise a releasable connection such as a plug and socket connection for passing an electrical signal from some point inside the photocopier to control the apparatus of the invention. This would be a simple solution to the problem of synchronising the photocopier and the apparatus but would, however, require modification of existing photocopiers. We therefore prefer to control operation of the apparatus by light sensitive means adapted for receiving light from the light source within the photocopier.

The apparatus is also adapted so that at least part of it may be readily moved away from the window of the photocopier whereby the photocopier may be utilised to photocopy conventional documents without the use of the apparatus.

The present invention also provides apparatus for automatically feeding sheet material to a photocopier for reproduction comprising means for feeding the sheet material, said feeding means being adapted to feed said sheet material discontinuously so that whilst the sheet material is stationary it can be reproduced, means for receiving signals from the photocopier for controlling operation of the feeding means, and means for connecting the apparatus to the photocopier whereby at least part of the apparatus is movable towards and away from a window of the photocopier, whereby when moved away from the window of the photocopier, the photocopier may be utilised in a conventional manner to photocopy other documents.

The apparatus of the invention therefore provides an apparatus which may be added to an existing photocopier or may be hired for a short period as desired and no extensive modification of the photocopier is required.

Variable delay means may be provided for delaying the feed of said sheet material so that a particular portion of the sheet material may be reproduced a predetermined number of times. Thus the photocopier, which is operating continuously, will continue to reproduce the same portion of the sheet material for the number of times depending upon the time which that portion of sheet material is applied to the photocopier. This time may be varied to vary the number of traverses that the light source of the photocopier makes and the number of traverses may be counted by the light sensitive means to provide the desired number of copies.

Means may be provided to control the feed of sheet material between each stationary phase so as to move the sheet material forward by a predetermined distance if the sheet material is on separate sheets.

A preferred arrangement of the invention will now be described by way of example only and with reference to the accompanying drawings in which.

Figure 1:
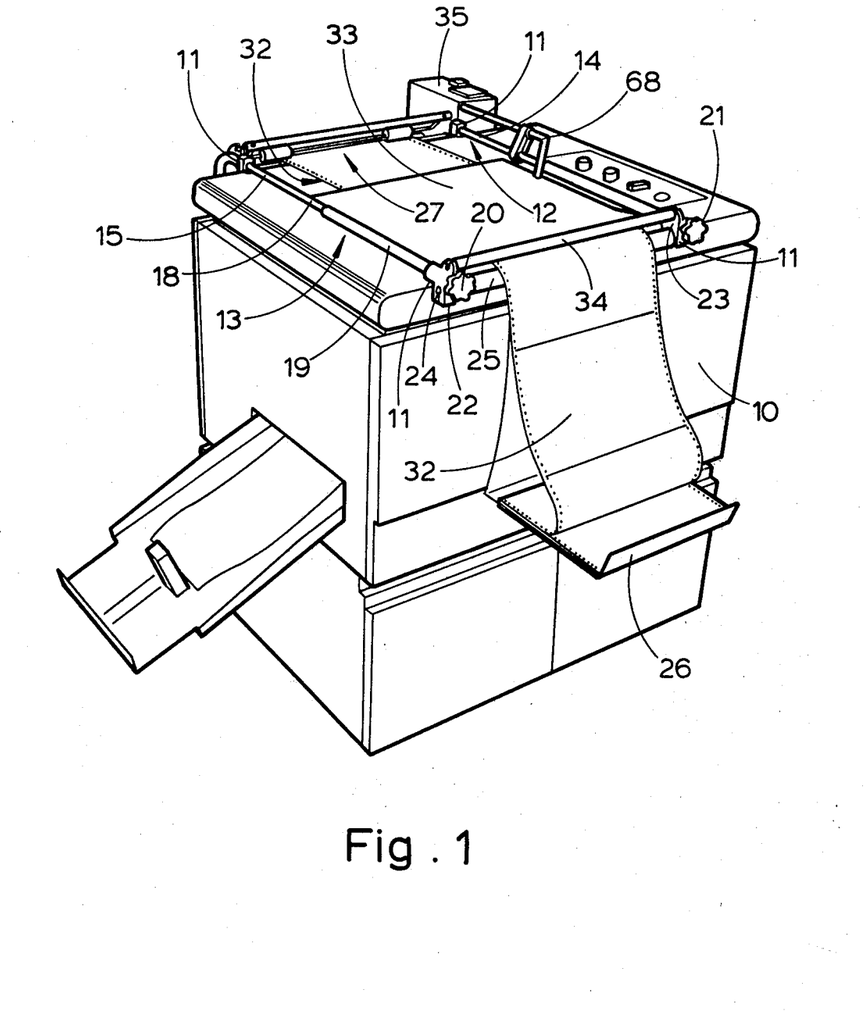
FIG. 1 is a general view from the rear and to one side of the apparatus of the invention when removably attached to a photocopier.

The apparatus is shown in general arrangement in FIG. 1. As is clear from FIG. 1 the apparatus is adapted to rest over the top of a flat bed photocopier 10 and is clamped thereto by means of clamps 11 which will be described later.

The apparatus includes two parallel rail members 12, 13 each comprising a horizontal portion 14, 15 and a generally vertical portion 16, 17. The horizontal portions 14, 15 extend horizontally across the top of the flat bed photocopier 10 on each side of the opening on which material to be reproduced by the photocopier 10 should be laid. The opening generally forms a glass window. The vertical portions 16, 17 of the rail members 12 and 13 extend downwardly parallel to the front face of the photocopier 10.

The horizontal portions 14, 15 are similar and each comprise two tubular members 18, 19, the tubular members 18 being towards the front of the apparatus and the tubular members 19 being towards the back of the apparatus and the tubular members 19 being of greater diameter than the tubular members 18 whereby the two tubular members 18, 19 telescope within one another.

Within the end of the tubular members 18 are mounted respective captive nuts (not shown) and extending through the tubular members 19 are respective threaded rods (not shown) engaging a respective captive nut, the threaded rods carrying at their outer ends, beyond the tubular members 19, respective knurled knobs 20, 21. The knurled knobs are fixed to the threaded rods so that rotation of the knurled knobs 20, 21 will cause the tubular members 18, 19 to telescope into one another to a variable degree.

The clamps 11 comprise finger members 22, 23, attached to respective tubular members 18 and mounted so as to be downwardly depending so that, as shown in FIG. 1, the finger members 22 abut against the front vertical surface of the photocopier 10. The finger members 23 are attached to the rear end of the tubular members 19 and again are mounted so as to downwardly depend to grip the rear vertical surface of the photocopier 10.

The finger members 23 each include bearing means 24 and between which is rotatably mounted a rear roller 25.

Figure 2:
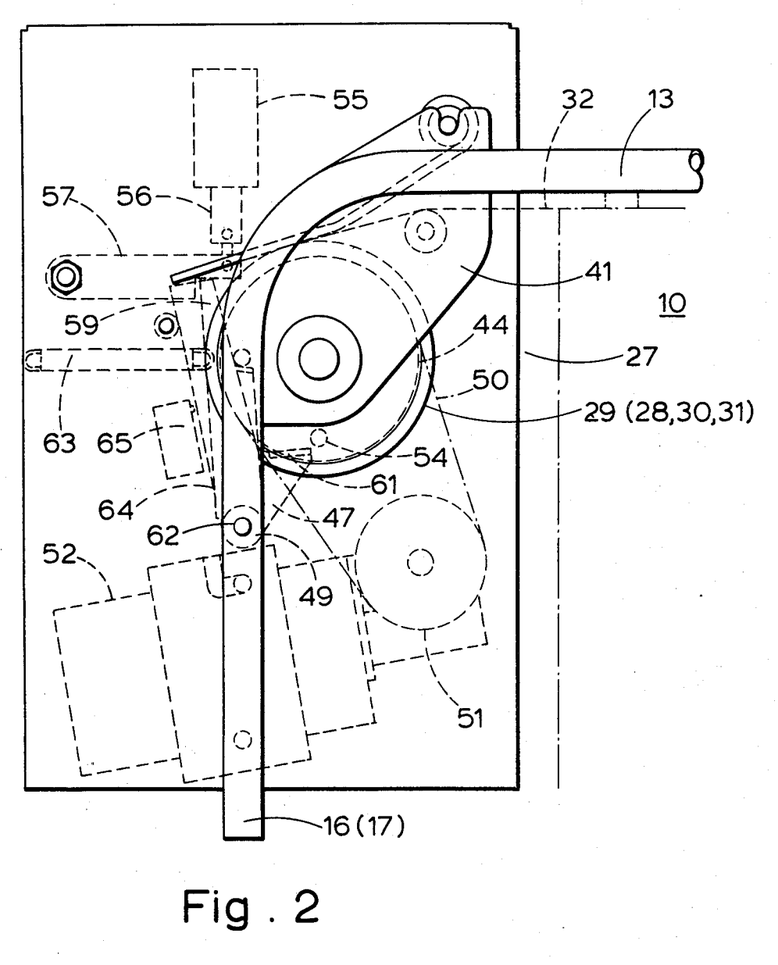
FIG. 2 is a side view from the right of the front part of the apparatus of the invention.
Figure 3:
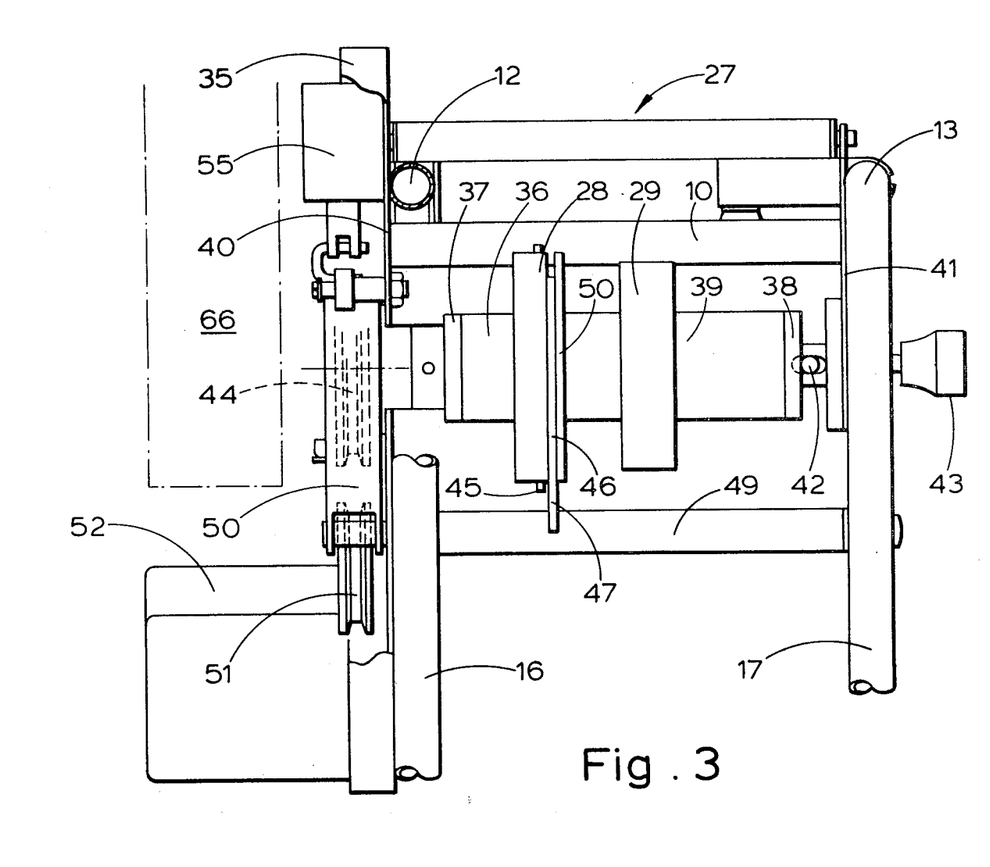
FIG. 3 is a front view of the part of the apparatus shown in FIG. 2, FIGS. 4 to 6 are side views of respectively a roller, a trigger and a stripper plate of the apparatus.

As will be understood from FIGS. 1 to 3 there is arranged between the rail members 12, 13 adjacent the front of the photocopier means 27 for feeding the sheet material forwardly from a tray 26 mounted on the rear of the photocopier 10 across the glass window and to the front of the photocopier 10. Feeding means 27 comprises four rollers 28, 29, 30, 31 adapted so that the tangent from their uppermost points is generally parallel with the top surface of the photocopier 10 so that the sheet material 32 is fed across the glass window parallel to the upper surface of the photocopier 10.

To prevent damage to the operator's eyes owing to the intense light emitted through the glass window from inside the photocopier 10 there is provided an opaque blanket 33 extending between the rail members 12, 13 and between the front and rear of the photocopier 10, the blanket 33 being mounted on a spring loaded roller 34 mounted between finger members 23.

At the front end of the rail member 13 there is mounted a box 35 comprising the means for driving and controlling the rotation of the plastics rollers 28 to 31.

Referring to FIG. 3, the rollers 28 to 31 are all mounted on a tube 36. The rollers 28 to 31 are a sliding fit on the tube 36 and may be slid therealong to space them as desired. The tube 36 has two end members 37, 38, a driven axle 39 passing through the end members 37, 38 and through the tube 36. The end members 37, 38 are rotatable relative to the axle 39 which is rotatably mounted between two plates 40, 41, one attached to one rail member 12 and the other 38 attached to the other rail member 13. Mounted adjacent one end of the axle 39 is a pin 42 which is pushed by means of a rotatable knob 43 into engagement with the end member 38 so as to cause the tube 36 to rotate with the axle 39. The axle 39 is driven by a pulley 44 mounted within the box 35.

Figure 4:
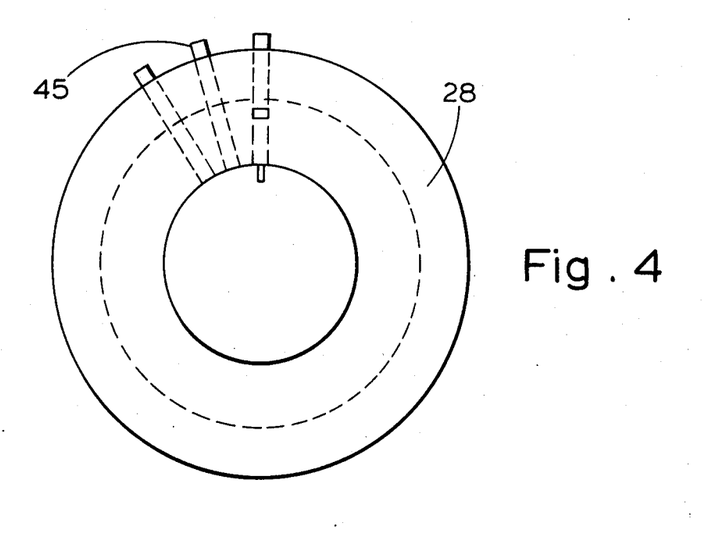

The outer rollers 28, 29 are of larger diameter than the inner rollers 30, 31 and as will be clear from FIGS. 2 and 4 each of the rollers 28 and 29 includes extending outwardly from its circumferential surface pins 45 spaced at predetermined intervals around the circumference (only three are shown in FIG. 4). The outer diameter of the outer rollers 28, 29 (but excluding the pins 45) is the same as the outer diameter of the rollers 30, 31.

Figure 6:
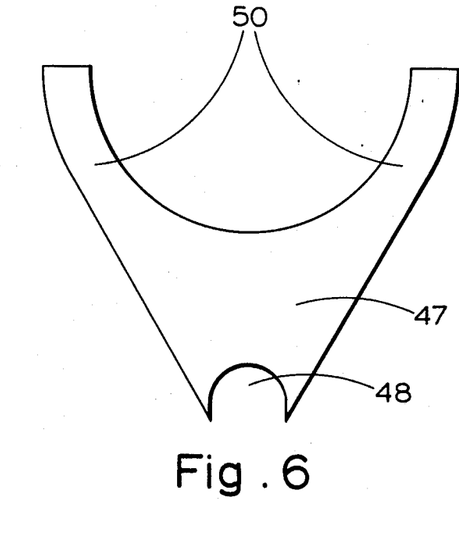

The outer rollers 28, 29 each include a groove 46 in their circumferential surfaces. Stripper plates 47 (illustrated in FIGS. 3 and 6) are mounted by means of a semi-circular notch 48 on a cylindrical bar 49 which extends between rails 12, 13 parallel to the axle 39 and at a suitable distance therefrom so that two fingers 50 of the stripper plate 47 extend into the groove 46.

Figure 5:
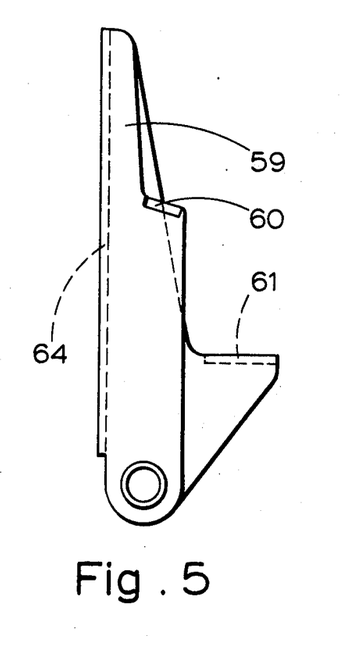

Within the box 35 is mounted means for driving the pulley 44 so as to draw the continuous sheet across the photocopier 10 in a discontinuous manner. The pulley 44 is driven by means of a belt 50 driven in turn by a pulley 51 driven by means of gearing (not shown) and an electric motor 52. The pulley 44 includes two pins 53, 54 which project parallel to the axis of the pulley 44 and from its side. Within the box 35 is mounted a solenoid 55, the plunger 56 of which abuts a pivotally mounted latch 57 of nylon, the latch 57 including a shoulder 58 cooperating with a trigger 59 of folded metal which is illustrated in more detail in FIG. 5. The trigger 59 includes a first shoulder 60 and a second shoulder 61 and is pivotally mounted by means of a pivot 62. A spring 63 urges the trigger 59 in an anticlockwise direction in FIG. 2.

The trigger 59 also includes a back surface 64 which abuts a microswitch 65.

The exact relative disposition of the parts is illustrated clearly in FIG. 2.

Also mounted within the box 31 is an electronic counter 66 including (not shown) means by which a number of counts may be preset on a suitable indexing means.

Light sensor means 67 in the form of a photocell is mounted in the box 35 and light is passed thereto by light guide means 68 mounted on rail 12 from a position adjacent the glass window and a hole 69 is provided in the blanket 33 through which the light sensor 67 may view the top surface of the sheet material over the glass window.

The apparatus may also include, extending between the rail members 12, 13 at the end opposite the box 35 a further roller including a mask which may be pulled across the top of the photocopier to mask around the glass window.

The present apparatus is used as follow. Whilst the apparatus is being set up the blanket 33 is retracted on its roller 34 as is the mask.

The apparatus is laid over the photocopier so that the rail members 12, 13 each extend from front to rear of the photocopier 10 as shown in FIG. 1, the vertical portions 16, 17 of the rail members passing down the front of the photocopier. The horizontal portions 14, 15 of the rail members 12, 13 extend horizontally parallel to the top surface of the photocopier and the apparatus is then connected releasably to the photocopier as follows.

The front finger members 22 are arranged so as to be adjacent the front vertical surface of the photocopier 10, and the rear finger members 23 are arranged to be behind and adjacent the rear vertical surface of the photocopier 10. The knobs 20, 21 are then rotated so as to rotate the threaded rod which will pull the tubular members 18 into the tubular members 19 and thereby pull the finger members 22, 23 together until they engage the front and rear vertical surfaces of the photocopier and clamp the photocopier. The apparatus is thereby removably clamped to the photocopier.

The rails 12, 13 are spaced from the top surface of the photocopier by means of shoulders 70 on the finger members 22, 23.

The mask is pulled across the top of the photocopier and is aligned as desired with the glass window.

If fan fold paper is to be copied then the pile of fan fold paper is situated on the tray 26 behind the photocopier and the leading edge of the fan fold paper is passed over the top surface of the photocopier and across the glass window. Pin holes extend down each side of the fan fold paper and the leading pin holes are engaged with whichever of the roller pairs 28, 29 or 30, 31 are suitable.

The blanket 33 is then pulled across so as to cover the fan fold paper over the glass window. This prevents light passing from the photocopier into the operator's eyes which is unpleasant and undesirable. As previously indicated, the light sensor 67, when the blanket 33 is in this position, views through a hole 69 in the blanket the top surface of the fan fold paper above the glass window. The light source is sufficiently strong that light passes through the sheet to be recorded by the light sensor 67.

The counter 66 is set to the desired number of reproductions of each part of the fan fold paper. Let us assume that this counter is set at number 3. The photocopier is then switched to its continuous reproduction mode and operation commences. The photocopier will reproduce the part of the fan fold paper over the glass window three times and as is conventional the photocopier includes a powerful light source which moves or the light from which is scanned across the glass sheet and hence across the fan fold paper, and this light input is sensed by the light sensor 67. Each time the light sensor 67 senses the light from the photocopier it passes a signal to the counter 66 and once the counter 66 has counted three such signals which will correspond to the photocopier having reproduced the part of the fan fold paper over the window three times, it passes a signal to the solenoid 55. Energisation of the solenoid 55 causes the latch 57 to be lifted which in turn releases the trigger 59 which may then be retracted by means of the spring 63 anticlockwise in FIG. 2. This releases the pulley 44 and operates the microswitch 65 which causes the motor 52 to be switched on to rotate the pulley 44 through the belt 50 and pulley 51.

The pulley 44 continues to rotate for almost a complete turn. By this time the solenoid 55 is no longer energised and the latch 57 is urged downwardly in FIG. 2 but is prevented from downward movement by the trigger 59. As the second pin 54 passes the second shoulder 61 of the trigger 59 it rotates the trigger 59 back to the position shown in FIG. 2 thereby resetting the latch 57 and the trigger 59 in the position shown in FIG. 2 so that when the first pin 53 completes a rotation it engages once again with the first shoulder 60 of the trigger 59. The latch and trigger and pulley have then returned to their original positions but the pulley has rotated by 360°.

The diameter of the rollers 28, 29 are arranged that one rotation in this way is sufficient for the rollers 28, 29 to pull by means of the pins 42 the fan fold paper by one complete window length so that a second sheet length contigous with the sheet length just photocopied then overlays the window ready to be photocopied by the photocopier. Furthermore, it is arranged that this movement takes place in less than the time between successive photocopying actions by the photocopier so that by the time the photocopier is ready to photocopy a fourth time the second sheet length has been presented to the glass window. The action can then be repeated and eventually three copies of the complete fan fold paper may be photoreproduced.

In some circumstances there are other adjustments to be made to the apparatus. For example in many cases the point along the fan fold paper sheet at which one wishes to begin photocopying will not exactly align with the glass window and this means that the rollers 28, 29 must be rotated relative to the axle 39 and as described above this is done by releasing the tube 36 from the axle 39 and rotating the tube 36 relative to the axle 39 until the fan fold paper is aligned as desired with the glass window.

As shown in FIG. 2 the stripping plates ensure that the fan fold paper as it is fed by the rollers 28, 29 is released to drop to the front of the photocopier.

After use, the apparatus may be released and lifted from the photocopier so that the photocopier may be returned to its normal use.

The facility of readily removing the apparatus from the photocopier makes the photocopier more flexible than would otherwise be so and allows a person or company owning a photocopier to utilise the apparatus to allow them to reproduce fan fold paper without the necessity of buying a photocopier specifically adapted for the purpose at a considerable saving in cost.

Although we have described the apparatus for use with fan fold paper, any continuous sheet material may be reproduced in this way by similar apparatus. If simple rolls of sheet material are to be reproduced without for example pin holes along each side then the rollers 28, 29 need not carry pins.

As the photocopier has been set to its continuous operation mode it will continue to operate even when the fan fold paper has been completely fed through the apparatus. Under those circumstances, means may be provided for sensing when the fan fold paper has been completely fed through the apparatus and, if the photocopier is connected to the electrical mains through a suitable switching connection, the photocopier may be switched off.

Also guide roller means may be provided above the rollers 28 to 31 to guide the fan fold paper to the rollers 28 to 31.

In a simplified arrangement of the apparatus in which only a single copy of the fan fold paper will be sufficient, the counter 66 can be disposed with. In its place is provided apparatus which detects the light from the photocopier light source. In the case of strobe light source, the detector simply detects the flash of light or in the case of a scanning light source, the light detector detects when the scanning light source passes a particular point, generally at the end of the scan. The light detector passes an electrical signal to the solenoid 55 to initiate movement of the fan fold paper in accordance with the above described detected light signal. Since the photocopier light source is only flashed once per photocopying action (in the case of a strobe light source) or makes a one scan per reproduction, no counting is required.

A second example of apparatus according to the invention will now be described with reference to FIGS. 7, 8 and 9.

The general arrangement of the apparatus is broadly similar to that of the arrangement of FIGS. 1 to 6. Similar parts have been given the same reference numbers and will not be described in detail.

As before the apparatus is adapted to rest on the top of a flat bed photocopier 10. In the present instance instead of stretching from front to rear of the photocopier the apparatus is adapted to be connected to points on the top and/or back and/or sides and/or front of the photocopier as is suitable. In the example shown in FIG. 7, the photocopier in question includes two bores 110 into which slips pins 111 mounted on the apparatus and the apparatus is further supported by means of a plate 112 which may be readily mounted to the rear of the photocopier by means of screws already provided. The plate 112 includes a hook which may engage with a suitably formed strut 113 of the apparatus.

Figure 9:
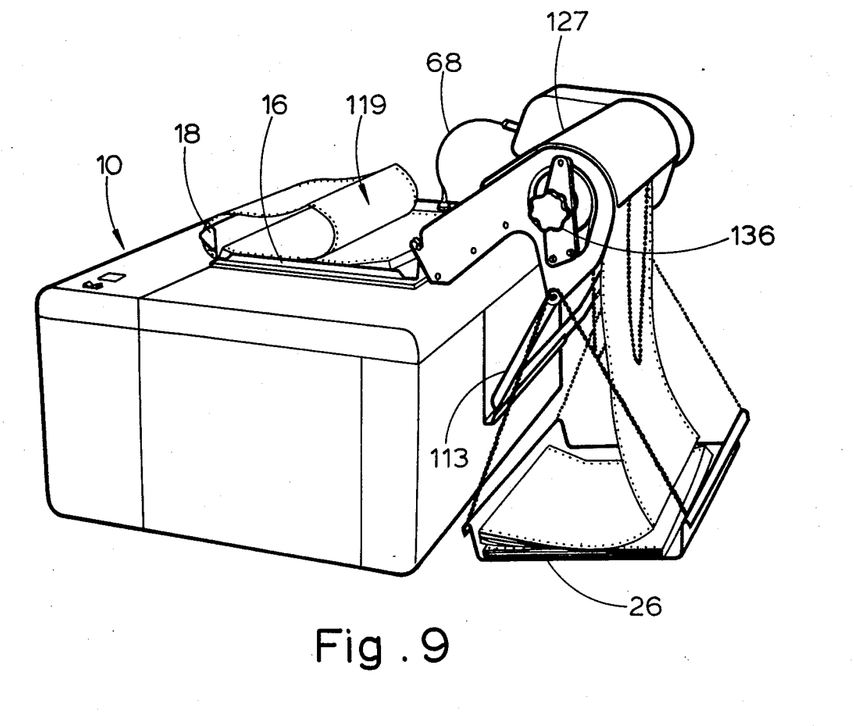

Referring to FIG. 9 the general arrangement of the apparatus includes two side plates 114 mounted to the strut 113 and adapted to carry between them the tube 36 and pin rollers 28 to 31 of a similar type to those in FIG. 3.

The side plates 114 carry means to engage the pins 111.

Pivotally mounted to the front end of the side plates 114 by means of pivot pin 115 is a platen 116 adapted so as to cover the window of the photocopier and including means whereby to mount the pile 119 of fan fold paper thereon. The platen 116 is spaced by means of dimples 117 from the window of the photocopier. The front edge 118 of the platen includes an upstanding lip over which fan fold paper may be fed from the pile 119 under the platen 116 across the window of the photocopier.

An apron 121 is provided between the side plates 114 over which the paper may pass from under the rear edge of the platen up to the rollers 28, 29, the apron 121 including mounted therebelow a microswitch 122 operated by a wire arm 123 passing upwardly through a hole in the apron 121, so that as fan fold paper passes over the apron 121, the wire arm 123 is depressed. This is aided by the weight of a drag link 124 bearing on the top surface of the paper.

Further there are provided brushes 126 mounted on arms 127 which engage the upper surface of the paper and urge the paper into engagement with the pins on the rollers 28 to 31. Two brushes 126 are provided, one for each roller in use.

Figure 8:
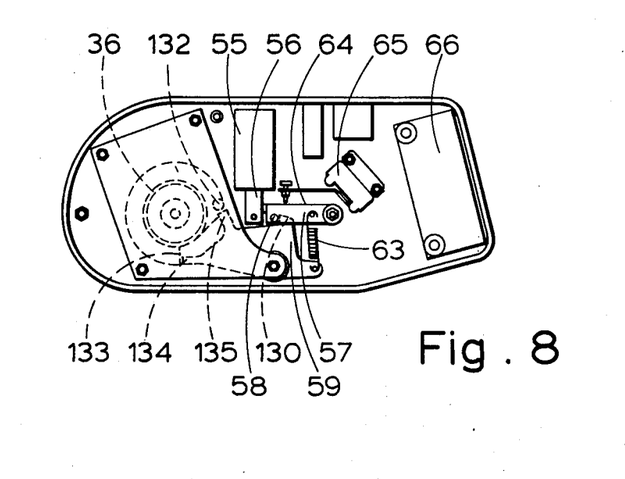
FIG. 8 is a side view of the control apparatus of the apparatus of FIG. 7 with the side plate of the control box removed showing the mechanism inside, and, FIG. 9 is a perspective view of the apparatus of FIGS. 7 and 8.

Mounted to one side of one of the side plates 114 is a control box 128 the interior of which is illustrated in more detail in FIG. 8.

In general terms, the apparatus in FIG. 8 is similar to that in FIG. 2 except that the motor drives the tube 36 through a friction clutch (not shown in detail) which is mounted between the motor and the part of the apparatus now to be described.

Connected to rotate with the tube 26 is a plate carrying a pin 132 corresponding to pin 54 of FIG. 2 and a cut away edge 133. The remaining parts to be described carry the same reference numerals as corresponding parts in FIG. 2. There is provided a solenoid 55, the plunger 56 which abuts a pivotally mounted latch 57, the latch 57 including a pin 58 cooperating with a shoulder 130 of trigger 59. The trigger 59 includes a finger 134 and a finger 135 and is pivotally mounted by means of a pivot 62. A spring 63 urges the trigger 59 in an anti-clockwise direction. The latch 57 also includes a back surface 64 which abuts the arm of a microswitch 65. The exact configuration of the parts is illustrated in FIG. 8.

Mounted within the box is the electronic counter 66.

Figure 7:
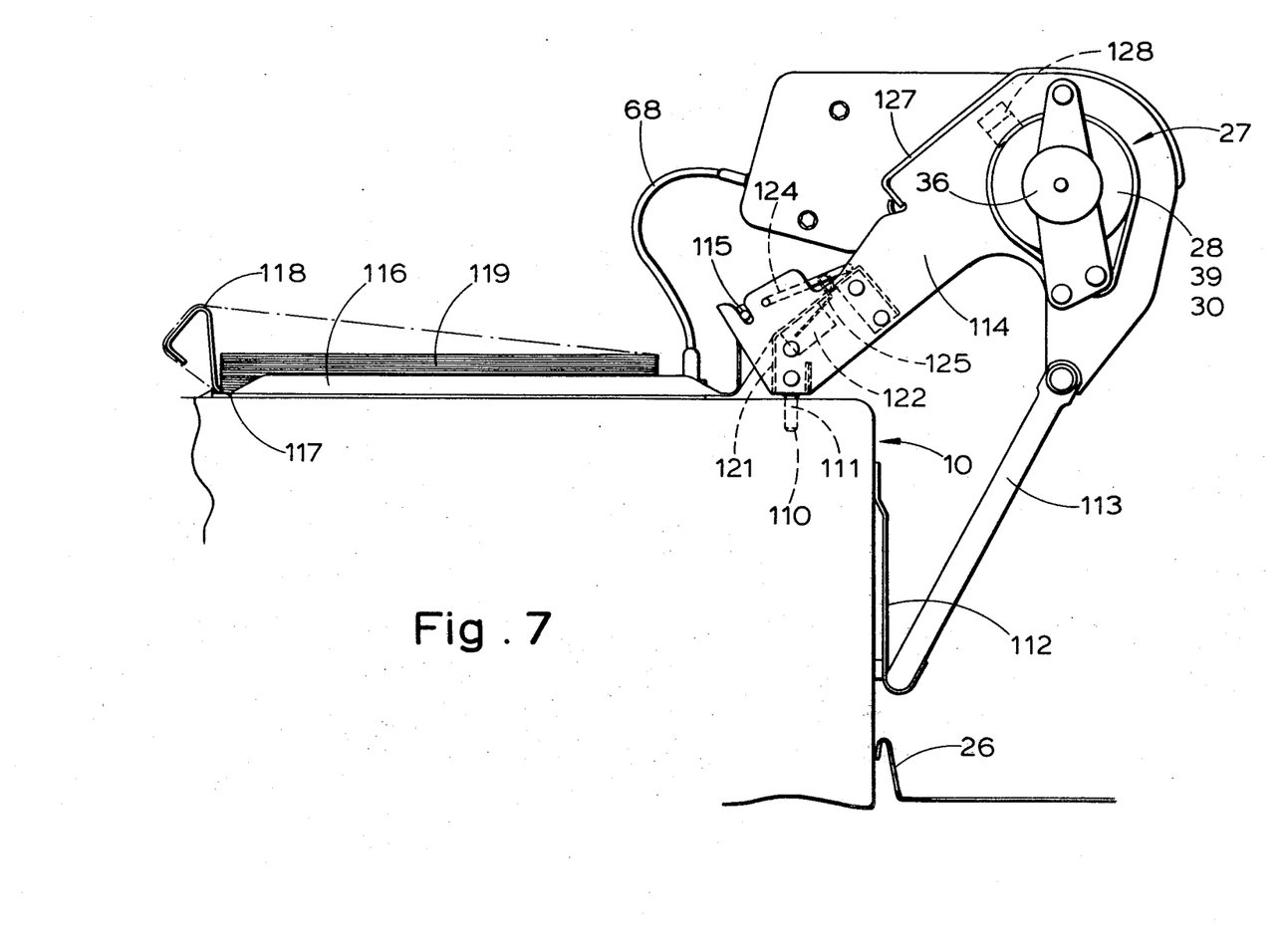
FIG. 7 is a side view of a second embodiment of the apparatus according to the invention attached to a photocopier.

The apparatus of the arrangement of FIGS. 7 to 9 is operated as follows. A stack of fan fold paper is mounted on the platen 116 and the leading edge of the fan fold paper is passed over the front edge 118, under the platen across the window of the photocopier, over the top of the apron 121 thereby depressing the wire arm 123 of the microswitch, into engagement over the top of rollers on the tube 36, and down to form a pile on the rear tray 26.

As the fan fold paper passes up to engage with the rollers it is urged into engagement with the pins on the rollers by means of the brushes 128.

As before, the light sensor views via light lead 68 and through a hole in the platen the top surface of the fan fold paper above the glass window. The light source is sufficiently strong to be recorded by the light sensor through the fan fold paper.

The counter is set for the required number of reproductions and operates in the manner described with regard to the embodiment of FIGS. 1 to 6.

When the counter 66 sends a signal to the solenoid 55 the solenoid lifts the latch 57 so that the pin 58 is disengaged from the adjacent shoulder 130 of the trigger 59 and the trigger 59 is then urged in an anti-clockwise direction by the spring 63. This disengages the finger 134 from the edge 133 thereby allowing the tube 36 to rotate. At the same time the lifting of the latch 57 activates the microswitch 65 which switches on the motor to cause the motor to drive the tube 36 one complete revolution. Towards the end of the complete revolution in the anti-clockwise direction the pin 132 engages the back of finger 135, which thereby urges the trigger 59 in a clockwise direction. The shoulder 130 then lifts the latch 57 and the pin 58 of the latch 57 reengages with the shoulder 130. This switches off the microswitch 65 which thereby de-energises the motor. The tube 36 comes to rest in a position in which the edge 113 abuts the finger 134 and the motor is allowed to continue overrunning through the action of the friction clutch.

The provision of the friction clutch prevents the instantaneous stopping of the motor and damage thereto. Reverse rotation of the tube 36 is prevented by engagement of the pin 132 and finger 135.

As with the embodiment of FIGS. 1 to 6, the counter may be replaced by electronic apparatus which detects the light source once per photocopying action and produces a pulse to operate the solenoid 55. In this case only a single photocopy is taken of each portion of the fan fold paper.

Because the tube 36 is rotated by exactly 360° each rotation as is determined by engagement of the edge 133 with the finger 134 the fan fold paper is advanced by an exactly accurate amount each rotation.

When the fan fold paper has finished and no paper is passing over the wire arm 123 of the microswitch 122 then the wire arm 123 will lift changing the switch 122 thereby producing a signal. This signal, can be used to operate an alarm or, if coupled to the photocopier can be used to switch off the photocopier.

By virtue of the pivotal arrangement of the platen with respect to the remainder of the apparatus it is possible to retain the apparatus on the photocopier and to use the platen 116 in place of the conventional platen on the photocopier. Thus conventional photocopying may be produced between operation of the apparatus.

The other parts of the apparatus not specifically described with reference to the embodiment of FIGS. 7 to 9 may be readily understood with reference to the embodiment shown in FIGS. 1 to 6.

As with the previous embodiments, the apparatus may be simply removed from the photocopier 10 by lifting thereby disengaging the pins 111 from the bores 110 and the strut 113 from the plate 112. If the microswitch 122 is connected to the photocopier, it may be through a releasable plug and socket.

The apparatus may also include a manual reset button to zero the counter 66 in the case of problems, for example, if the paper feed to the photocopier jams.

There may also be provided a manual button to override the counter which on pressing will feed the fan fold paper and which may be used during the setting up operation to assist in feeding the fan fold paper through the apparatus before photocopying commences.

In the apparatus in which no counter is provided, there may be provided a manual override button which when set allows the fan fold paper to be moved forward one sheet at a time rather than the automatic operation described.

It will be understood, that in all versions described, by simply releasing the tube 36 and replacing the rollers with different diameter rollers, the fan fold paper may be moved forwardly by a differing amount so that different depth fan fold paper may be dealt with. This is because the tube rotates by one complete revolution per feed of the paper and by varying the diameter the linear length of fan fold paper fed per revolution is varied. In place of the wire arm 123 and microswitch 122 there may be provided a light reflective system. For example a light source may be provided below the apron which directs light upwardly and a detector is also provided under the apron which detects light reflected from the fan fold paper. When the fan fold paper has finished the light beam will not be reflected to the light detector and this will switch off the apparatus.

We claim:

1. Apparatus for automatically feeding sheet material to a photocopier for reproduction comprising means for removably connecting the apparatus to a photocopier, means for feeding the sheet material, said feeding means being adapted to feed said sheet material discontinuously so that whilst the sheet material is stationary it may be reproduced, and signal receiving means for receiving signals from the photocopier for controlling operation of the feeding means, said signal receiving means comprising a light sensitive means adapted to receive light from a light source within the photocopier.

2. Apparatus as claimed in claim 1 comprising means by which at least part of the apparatus may be readily moved away from a window of the photocopier whereby the photocopier may be utilized to photocopy conventional documents without the use of the apparatus.

3. Apparatus as claimed in claim 2 in which said means to move at least part of the apparatus away from the window comprises releasable clamp means whereby the apparatus may be removed from the photocopier.

4. Apparatus as claimed in claim 2 in which the means to move at least part of the apparatus away from the window comprises pivot means whereby the part of the apparatus overlying the window can be pivoted away from the window.

5. Apparatus as claimed in claim 4 in which the part of the apparatus overlying the window comprises a platen pivotally attached to the remainder of the apparatus, the platen including on its top surface means for mounting a supply of the sheet material.

6. Apparatus as claimed in claim 1 in which the means for feeding the sheet material comprises tooth rollers which are driven so as to rotate by one complete revolution and then stop.

7. Apparatus for automatically feeding sheet material to a photocopier for reproduction comprising means for removably connecting the apparatus to a photocopier, means for feeding the sheet material, said feeding means comprising tooth rollers which are driven so as to rotate by one complete revolution and then stop whereby to feed said sheet material discontinuously so that whilst the sheet material is stationary it may be reproduced, and signal receiving means for receiving signals from the photocopier for controlling operation of the feeding means.

8. Apparatus as claimed in claim 1 comprising delay means for delaying the feed of the sheet material so that a particular portion of the sheet material may be reproduced a predetermined number of times.

9. Apparatus as claimed in claim 8 in which the delay means is controlled by a counter.

10. Apparatus as claimed in claim 7 in which the signal receiving means comprises a light sensitive means adapted to receive light from a light source within the photocopier and in which the means to feed the sheet material includes control means to feed the sheet material only when the light sensitive means receives light from the light source within the photocopier.

11. Apparatus for automatically feeding sheet material comprising means for feeding sheet material discontinuously so that whilst the sheet material is stationary it can be reproduced, means for receiving signals from a photocopier comprising a light sensitive means adapted to receive light from a light source within the photocopier to control operation of the feeding means, and means for connecting the apparatus to the photocopier whereby at least part of the apparatus is movable towards and away from a window of the photocopier, whereby when moved away from the window of the photocopier, the photocopier may be utilized in a conventional manner to photocopy other documents.

12. Apparatus as claimed in claim 11 in which the means to move at least part of the apparatus away from the window comprises pivot means whereby the part of the apparatus overlying the window can be pivoted away from the window.

13. Apparatus as claimed in claim 12 in which the part of the apparatus overlying the window comprises a platen pivotally attached to the remainder of the apparatus, the platen including on its top surface means for mounting a supply of the sheet material.

14. Apparatus as claimed in claim 11 in which the means to feed the sheet material includes control means to feed the sheet material only when the light sensitive means receives light from the light source within the photocopier.

15. Apparatus as claimed in claim 14 comprising delay means for delaying the feed of the sheet material so that a particular portion of the sheet material may be reproduced a predetermined number of times.

16. Apparatus as claimed in claim 15 in which the delay means is controlled by a counter.

* * * * *